March 31, 1964 S. RASMUSSEN ETAL 3,127,587

DIGITAL COMPARING CIRCUITS

Filed Aug. 26, 1960 4 Sheets-Sheet 1

INVENTORS.
CARL P. SPAULDING
SVEIN RASMUSSEN

BY Christie, Parker & Hale

ATTORNEYS.

United States Patent Office 3,127,587

Patented Mar. 31, 1964

3,127,587

DIGITAL COMPARING CIRCUITS

Svein Rasmussen, San Pedro, and Carl P. Spaulding, San Marino, Calif., assignors to Datex Corporation, Monrovia, Calif., a corporation of California Filed Aug. 26, 1960, Ser. No. 52,108
4 Claims. (Cl. 340—146.2)

This invention relates to analog to digital converters and more particularly to electrical comparison circuits responsive to the digital output signals from an encoder representative of an actual position of a controlled member for comparing same with the desired position of the member as represented by command signals.

Encoders are used to indicate the angular position of a member, such as a shift, by the use of a coded disk with associated brushes. The coded disk is generally divided into a number of discrete sections defined by conductive and nonconductive segments with the conductive segments being connected to a common output line. The coded disk is rotatably connected to the member whose angular position is to be indicated and the brushes are positioned in slidable contact with the disk to provide a unique combination of contact closures for each particular angular position of the member and coded disk.

Encoders have been used in process control applications for converting angular shaft position to a digital coded signal, where the shaft position is controlled by a motor. In many applications an operator, or possibly a computer, is used to provide a command signal corresponding to the desired angular position of the shaft. In order to provide a closed process control loop and automatically position the shaft according to this command signal, a comparing device or circuit is needed to detect the difference between the angular position of the shaft and the command signal and provide a control signal for the motor for controlling shaft position.

Errors in reading the output signals from digital circuitry often occur due to the ambiguity created as the symbols representing information change, for example, when a brush sliding on a coded disk goes from a conductive to a nonconductive segment or in terms of relay circuits, contacts open and close. In order to reduce the number of ambiguities to a minimum, the coded output signal from digital circuitry may be translated to a code which will minimize the number of symbol changes between successive numbers occurring at any one time.

A translator has been used for translating the digital coded output signals from an encoder to a Datex binary code. A Datex binary code is a special code in which only one symbol (or contact closure) is changed for each succeeding number, and in which only one bit need be inverted to form the nines complement thereof. Other aspects of such an encoder, translator and numbering system are shown and described in a copending application of Carl P. Spaulding bearing Serial No. 415,058, filed on March 9, 1954, and assigned to the same assignee.

Thus, a comparing device or circuit is needed for comparing a Datex coded signal with the output signal from a source of command signals which provides output signals in another number system, for example, in the decimal number system, and must provide an output signal suitable for controlling a motor.

In order to provide a reliable and inexpensive comparing circuit one embodiment of the present invention provides an encoder having a coded disk adapted to be rotatably connected to a shaft. The encoder produces a digital coded output signal corresponding to the position of the shaft and a translator, connected to receive the output signals provided by the encoder, converts the digital coded output signal from the encoder to a signal coded in the Datex code. A comparison circuit comprising a relay network having an "equal to" relay network and "equal to or less than" relay network is connected to the output of the translator for receiving the Datex coded signal. A source of command signals, for producing a decimal coded command signal corresponding to the desired shaft position, is connected directly to other input circuits of the "equal to" relay network and the "equal to or less than" relay network. The comparison circuit is responsive to the output signal of the translator to cause the "equal to" relay network to connect the command signal to the single output circuit of the "equal to" relay network indicative that an equivalent signal has been provided by the encoder and is also responsive to the output signal of the translator to cause the "equal to or less than" relay network to connect the command signal to an output circuit of the "equal to or less than" relay network indicative of the provision by the encoder of a signal that is equal to or less than the command signal.

A preferred embodiment of the invention has an "equal to" relay network for comparing a Datex coded signal having a plurality of decades with a command signal having a decade corresponding to each decade of the Datex coded signal. A logical network is also connected to the output of the relay networks for providing a first predetermined output signal whenever all of the decades of the decimal command signal are equal to the corresponding decades of the Datex coded signal, a second predetermined output signal whenever the decimal command signal is less than the Datex coded signal, and a third predetermined output signal whenever the decimal command signal is greater than the Datex coded signal.

Other aspects of the present invention may be better understood with reference to the following detailed description and figures in which.

Before describing the details of the invention, a brief explanation of the terminology and the numbering system used will be given. The ordinary decimal number system, i.e., 1, 2, 3, etc., will be referred to as the "arabic decimal code." Table I hereinbelow, illustrates a "reflected decimal code" numbering in which the successive arabic decimal numbers thereof differ by only one symbol.

*Table I*

| Arabic Decimal Code | Reflected Decimal Code | Datex Code | | | |
|---|---|---|---|---|---|
| | | 1000's Digit | 100's Digit | 10's Digit | 1's Digit |
| 0000 | 0000 | X000 | X000 | X000 | X000 |
| 1 | 1 | | | | XX00 |
| 2 | 2 | | | | 0X00 |
| 3 | 3 | | | | 0XX0 |
| 4 | 4 | | | | 00XX |
| 5 | 5 | | | | 0XXX |
| 6 | 6 | | | | 0X0X |
| 8 | 8 | | | | XX0X |
| 9 | 9 | | | X000 | X00X |
| 10 | 19 | | | XX00 | X00X |
| 11 | 18 | | | | XX0X |
| 12 | 17 | | | | 0X0X |
| 13 | 16 | | | | 0XXX |
| 14 | 15 | | | | 00XX |
| 15 | 14 | | | | 00X0 |
| 16 | 13 | | | | 0XX0 |
| 17 | 12 | | | | 0X00 |
| 18 | 11 | | | | XX00 |
| 19 | 10 | | | XX00 | X000 |
| 20 | 20 | | | 0X00 | X000 |
| 21 | 21 | | | 0X00 | XX00 |
| 28 | 28 | | | 0X00 | XX0X |
| 29 | 29 | | | 0X00 | X00X |
| 30 | 39 | | | 0XX0 | X00X |
| 31 | 38 | | | 0XX0 | XX0X |
| 98 | 91 | | X000 | X00X | XX00 |
| 99 | 90 | | X000 | X00X | X000 |
| 100 | 190 | | XX00 | X00X | X000 |
| 101 | 191 | | XX00 | X00X | XX00 |
| 109 | 199 | | XX00 | X00X | X000 |
| 110 | 189 | | XX00 | XX00 | X000 |
| 111 | 188 | | XX00 | XX00 | XX00 |
| 325 | 375 | | 0XX0 | 0X0X | 00XX |
| 433 | 436 | | 00X0 | 0XX0 | 0XXX |
| 499 | 490 | | 00X0 | X00X | X000 |
| 500 | 590 | | 00XX | X00X | X000 |
| 1000 | 1900 | XX00 | X00X | X000 | X000 |

Table II shows, hereinbelow, a four binary digit "Datex code" with the corresponding arabic decimal code. When the Datex code shown in Table II is substituted for the corresponding digit of the reflected decimal code shown in Table I, the Datex code takes the form shown to the right in Table I, corresponding to the "arabic decimal" numbers and reflected decimal numbers.

*Table II*

| Arabic Decimal Code | Datex Binary Code — Relays | | | | Arabic Decimal Code | Datex Binary Code — Relays | | | |
|---|---|---|---|---|---|---|---|---|---|
| | 80 90 | 81 91 | 82 92 | 83 93 | | 80 90 | 81 91 | 82 92 | 83 93 |
| 0 | X | 0 | 0 | 0 | 5 | 0 | 0 | X | X |
| 1 | X | X | 0 | 0 | 6 | 0 | X | X | X |
| 2 | 0 | X | 0 | 0 | 7 | 0 | X | 0 | X |
| 3 | 0 | X | X | 0 | 8 | X | X | 0 | X |
| 4 | 0 | 0 | X | 0 | 9 | X | 0 | 0 | X |

Figure 1:
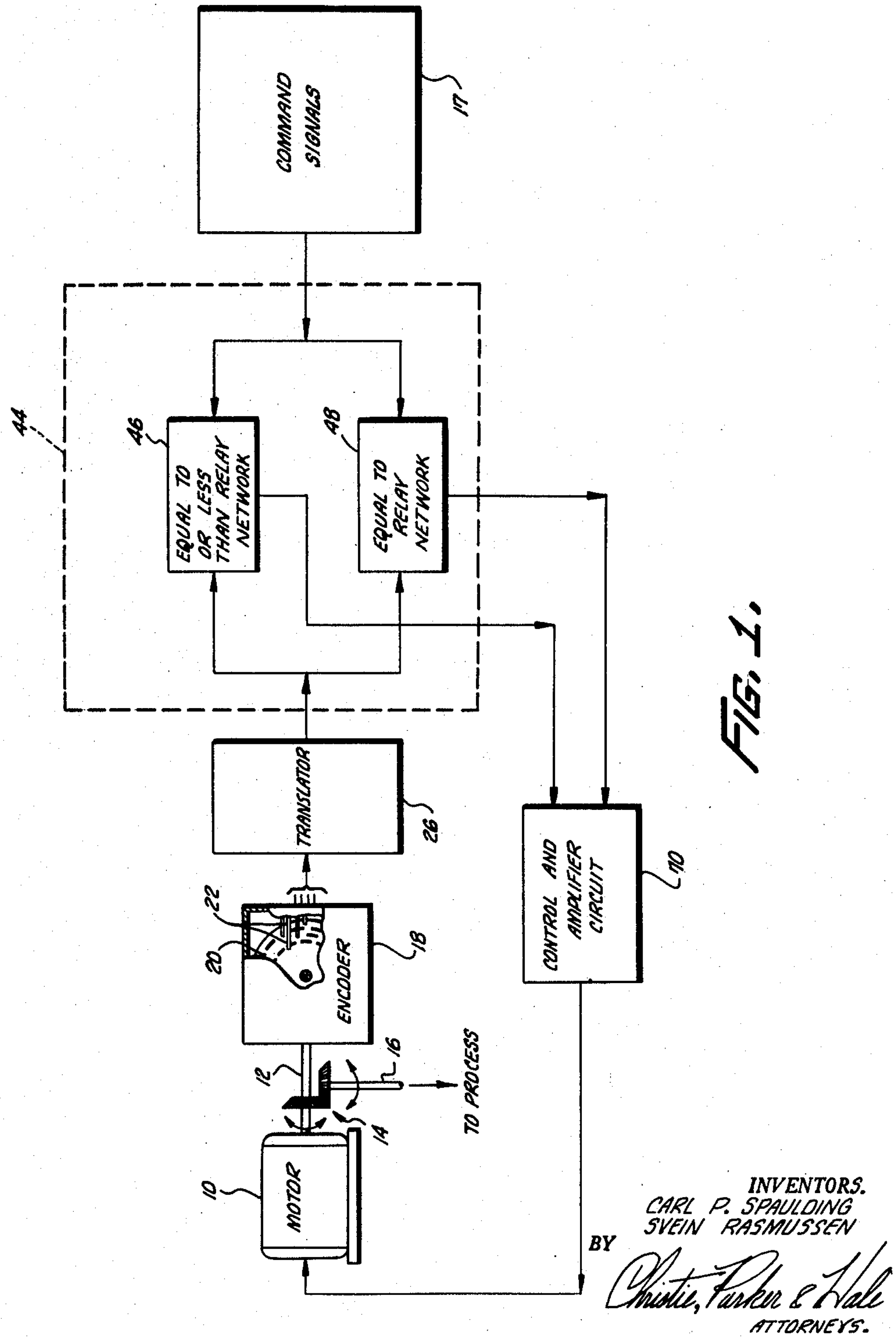
FIG. 1 is a pictorial diagram, partly in block form, of a process control system as used for automatically positioning a shaft in a process and embodying the present invention.

With the above tables in mind, the invention will be described with reference to FIG. 1 wherein a pictorial and block diagram of a process control loop is shown for controlling the position of a shaft 16. A control motor 10 has an output shaft 12 shown mounting one gear of a pair of bevel gears represented by the general symbol 14, the other bevel gear being connected to the shaft 16 which may control an operation in a process, for example the rolling of paper in a paper mill or for controlling the grinding wheel in a grinding operation in a steel mill. The motor 10 is capable of rotating the output shaft 12, hence the shaft 16, in either a clockwise or counter-clockwise direction, depending on the electrical control signals applied to its input circuit.

An operator, computer or other source of control may be used to adjust and provide a source of command signals 17 for giving a reference or command signal corresponding to the desired position of the shaft 16. Since the command signals from the source 17 may be spurious and not have any relation to the actual angular position of the shaft 16, a signal developed by the source 17 may correspond to a position of shaft 16 which may be reached faster by rotating the shaft 16 clockwise rather than counterclockwise or vice versa, or the signal may correspond to the actual angular position of shaft 16. Since speed is important in most process control operations, motor 10 must be energized so as to position shaft 16 to the desired position in an angular direction that will give the desired result in the shortest possible time. To generate the necessary control signals for motor 10, the relative position of shaft 16 with respect to the desired position, indicated by the command signals from source 17, must be determined. To determine relative position and to generate control signals for the motor 10, an encoder 18, translator 26, relay network 44 and a control and amplifier circuit 70 are provided.

The encoder 18 is provided with sensing elements or brushes, represented by the general symbol 22, arranged in slidable contact with conductive and nonconductive segments on a coded disk 20. The conductive and nonconductive segments on the coded disk 20 are arranged to provide a coded output signal in parallel by means of open and closed contacts provided by the brushes 22. The output of encoder 18 is connected to an input circuit of a translator 26. The translator 26 translates the output signal from the encoder 18, which may be, for example, in a binomial binary code, or a 1, 2, 4, 8 binary code, to the Datex code described above.

An output circuit of the translator 26 is connected to the input circuits of an "equal to" relay network 46, and an "equal to or less than" relay network 48 of the relay comparison network 44. The output circuits of the relay networks 46 and 48 are connected to an input circuit of the control and amplifier circuit 70 and an output circuit of the source of command signals 17. The control and amplifier circuit 70 then develops control signals at an output circuit, and which control signals are connected to the input of the motor 10. The control signals developed by the circuit 70 energize motor 10 for positioning its output shaft 12 (and shaft 16) to the desired position.

Figure 2:
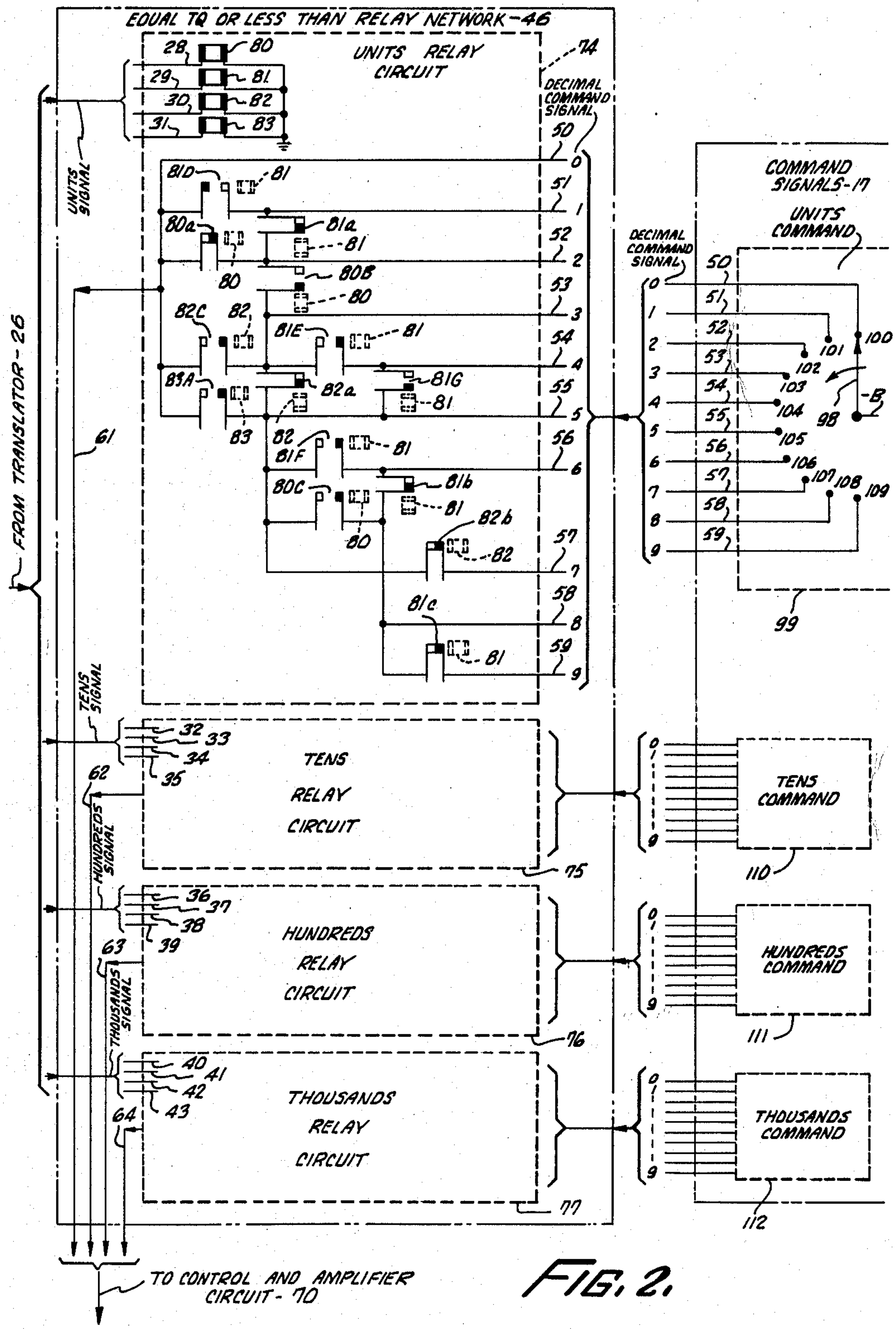
FIG. 2 is a circuit diagram, partially in block form, of a comparison circuit for indicating equality or less than equality and a source of command signals for use in the system of FIG. 1.
Figure 3:
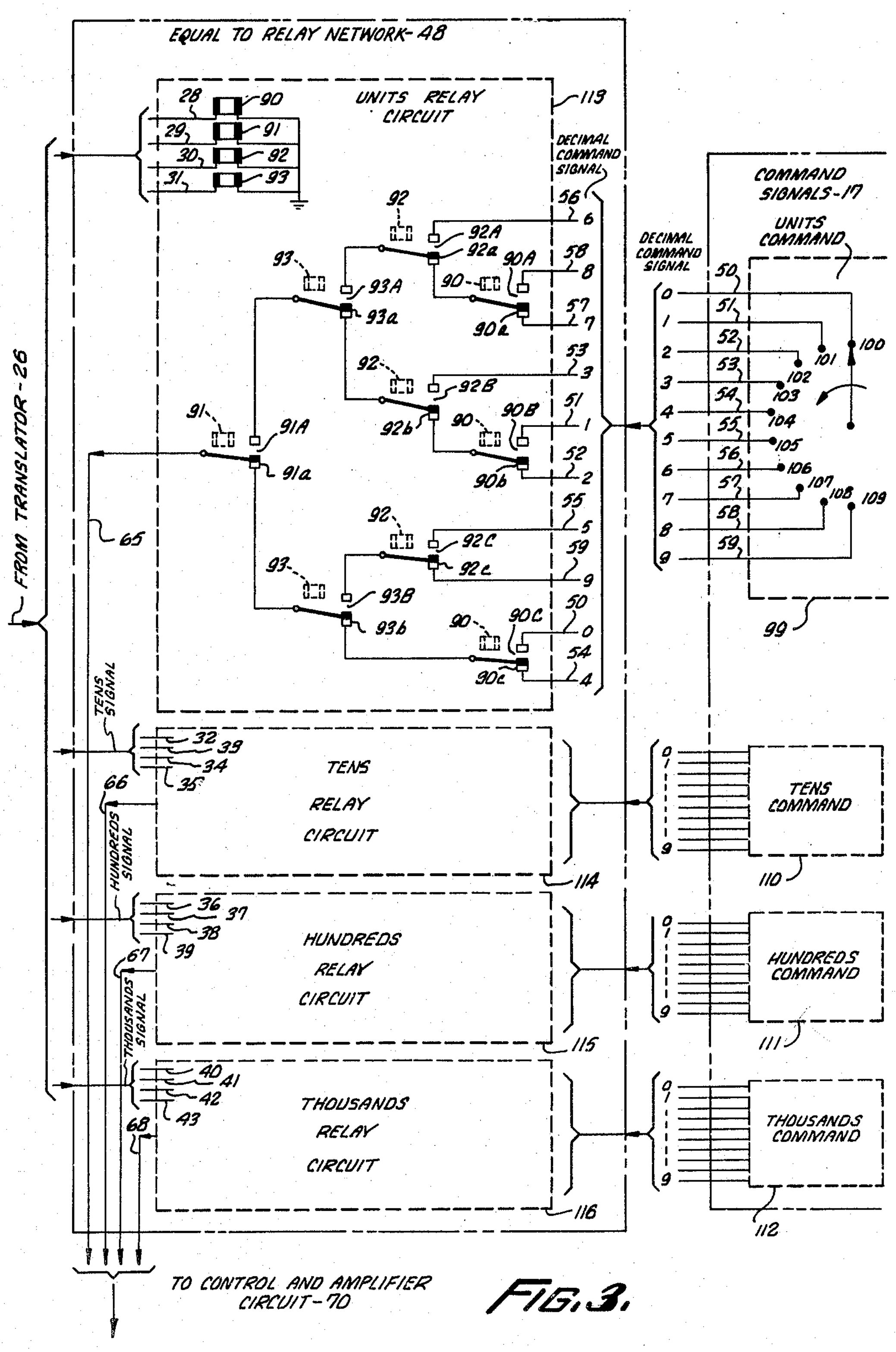
FIG. 3 is a circuit diagram, partially in block form, of a comparison circuit for indicating equality for use in the system of FIG. 1.

Referring now to FIG. 2, the source of command signals 17 are illustrated as four command circuits 99, 110, 111 and 112, which are for applying units, tens, hundreds and thousands command signals in parallel circuit relationship to the relay network 46, shown to the left of FIG. 2, and to the relay network 48, shown in FIG. 3. The rotary switch in the units command circuit 99 has a wiper arm 98 for individually connecting a source of negative potential (not shown) represented by the symbol —B to its contacts 100 through 109. Contacts 100 through 109 are connected to an output circuit of the relay network 46 by means of lines 50 through 59, respectively.

To provide a better understanding of the invention, the units command circuit 99 of command signal source 17 is said to represent a decimal command signal of zero when wiper arm 98 is connected to contact 100, a decimal command signal of 1 when wiper arm 98 is connected to contact 101, and in sequential straps a decimal command signal of 9 when wiper arm 98 is connected to contact 109. The tens, hundreds and thousands command circuits 110, 111 and 112 are similar to the units command circuit 99, therefore are not shown in detail but are indicated in block form by dashed lines.

The Datex coded output signal from translator 26 is represented by a number of open and closed contacts which correspondingly connect lines 28 through 43 of the "equal to or less than" network 46 to a source of potential. From the most significant digit to the least significant digit the signal respectively applied to lines 28 through 31 represent the units digit, and in the same fashion the signal applied to lines 32 through 35 represent the tens digit, the signal to lines 36 through 39 represent the hundreds digit and the signal to lines 40 through 43 represent the thousands digit of the Datex code of Table I.

Four relay circuits are shown in the "equal to or less than" relay network of FIG. 2, a units relay circuit 74, a tens relay circuit 75, a hundreds relay circuit 76 and a thousands relay circuit 77 having input circuits connected to lines 28 through 31, lines 32 through 35, lines 36 through 39 and lines 40 through 43, respectively. The lines 50 through 59 connect an output circuit of the units relay circuit 74 to the output of the units command circuit 99 and output circuits of relay circuits 75, 76 and 77 are connected to the output circuits of command circuits 110, 111 and 112, respectively in the same manner. The output circuits of the units relay circuit 74, tens relay circuit 75, hundreds relay circuit 76 and thousands relay circuit 77 are connected to common output lines 61 through 64, respectively, which are connected to the input circuit of the control and amplifier circuit 70.

Before describing the remainder of the invention, a brief explanation of the terminology to be used will be given. Relays will be designated by numbers, i.e., 80, 81, 90, etc., and the contacts represented by the corresponding relay numbers followed by a letter. The normally closed contacts are said to be closed when the relays are de-energized and are represented by the number of the corresponding relay followed by a lower case letter, i.e., 80*a*, 81*b*, 90*a*, etc., and normally open contacts which are said to be closed only when the relays are energized are represented by the number corresponding to the associated relay followed by a capital letter, i.e., 80C, 81D, 90C, etc. In order to indicate the associated relay coil in both FIGS. 2 and 3, a dotted outline representing a relay coil is located adjacent the associated relay contacts.

Referring again to FIG. 2, the units lines 28 through 31 from the output of translator circuit 26 are connected to one end of the coils of relays 80, 81, 82 and 83 of units relay circuit 74, the other ends of the coils being connected to ground (0 volts). Thus relays 80 through 83 are energized depending on the potential applied to lines 28 through 31 as defined by the units coded output signal from translator 26.

Referring now to the interconnections of the contacts of the relays, line 50 is connected directly to line 61. Line 51 is connected to one side of the normally open contacts 81D and to one side of the normally closed contacts 81*a*, the other sides of contacts 81D and contacts 81*a* being connected to lines 61 and 52, respectively. Line 52 is also connected to one side of normally closed contacts 80*a*, and to one side of normally open contacts 80B, the other side of these contacts being connected to lines 61 and 53, respectively. Line 53 is also connected to one side of normally closed contacts 82*a* and normally open contacts 82C, and 81E, the other side of these contacts being connected to lines 55, 61 and 54, respectively. Line 54 is also connected to one side of normally open contacts 81G, the other side being connected to line 55. Line 55 is also connected to one side of normally open contacts 83A, 81F and 80C and normally closed contacts 82*b*, the other side of the contacts being connected to lines 61, 56, 58 and 57, respectively. Normally closed contacts 81*b* are connected between lines 56 and 58. Normally closed contacts 81*c* are connected between lines 58 and 59.

The operation of the units relay network is best understood with reference to Table II in which the states of relays 80 through 83 are indicated above a corresponding digit of the Datex code, a symbol *x* representing an energized relay and a zero representing a de-energized relay. Assume now that the Datex coded signal applied to lines 28 through 31 by the translator 26 represents an arabic decimal digit zero. The relay 80 is energized and relays 81 through 83 are de-energized. In this state line 50 is connected to line 61 and lines 51 through 59 are disconnected from line 61 due to open contacts in the relay circuit. Thus only when wiper arm 98 is connected to contact 100 (therefore line 50), a decimal command signal of zero, will the negative potential of the —B source of power be connected to the common output line 61. Now assume the Datex coded signal applied to lines 28 through 31 is such that it represents an arabic digit 1, relays 80 and 81 are energized, and relays 82 and 83 are de-energized. In this state lines 50 and 51 are connected to lines 61 and lines 52 through 59 are disconnected from lines 61. In this condition relay circuit 74 only connects lines 50 and 51 to common output line 61. Thus in this condition relay circuit 74 will only connect the negative potential of the —B source of potential to common line 61 when the decimal command signal of the units command circuit 99 represents a decimal digit 0 or 1. Thus at each successive increasing digit another of the lines 50 through 59 are connected to common output line 61, until a decimal digit 9 is reached where lines 50 through 59 are all connected to line 61.

In summary, it may be seen that when the Datex coded signal applied to lines 28 through 31 represents an arabic decimal number and the decimal command signal applied to lines 50 through 59 represents that same arabic decimal number or less, the potential from the source of potential —B connected to wiper arm 98 will be connected to line 61 and applied to the control and amplifier circuit 70. Also it may be seen that if the Datex coded signal applied to lines 28 through 31 represents an arabic decimal number that is smaller than the arabic decimal number applied to lines 50 through 59, line 61 will be connected to an open circuit.

The tens relay circuit 75, hundreds relay circuit 76 and thousands relay circuit 77 are identical to the units relay circuit 74, and operate in the same manner.

Referring now to FIG. 3, the source of command signals 17, the units, tens, hundreds and thousands command circuits 99, 110, 111 and 112 are again shown to illustrate the interconnections between the rotary switches and the "equal to relay network" 48. A schematic diagram is also shown of the "equal to" relay network 48 having four relay circuits, a units relay circuit 113, a tens relay circuit 114, a hundreds relay circuit 115, and a thousands relay circuit 116, having input circuits connected to lines 28 through 31, lines 32 through 35, lines 36 through 39, and lines 40 through 43, respectively. Lines 50 through 59 also connect the output of the units command circuit 99 to one of two output circuits of the units relay circuit 113. Similarly, ten lines connect the tens, hundreds and thousands command circuits 110, 111 and 112 to the same output circuits of the relay circuits 114, 115 and 116, respectively. The other output circuits of the unit relay circuit 113, the tens relay circuit 114, the hundreds relay circuit 115 and the thousands relay circuit 116 are connected to common output lines 65, 66, 67 and 68, respectively, which are also connected to the input circuit of the control and amplifier circuit 70.

The lines 28 through 31, which connect relays 80 through 83 to the translator 26 also connect one end of the coil of relays 90 through 93 to the translator, the other end of the coils being connected to ground.

Referring now to the interconnection of the contacts of relays 90 through 93, line 50 is connected through the normally open contacts 90C, through the normally closed contacts 93*b*, and 91*a* to common line 65. The line 51 is connected through the normally open contacts 90B through the normally closed contacts 92*b* and 93*a* and through the normally open contacts 91A to common line 65. Line 52 is connected through normally closed contacts 90*b*, 92*b* and 93*a* and through the normally open contacts 91A to line 65. Line 53 is connected through the normally open contacts 92B through the normally closed contacts **93*a* and the normally open contacts 91A to common line 65. Lines 54 and 55 are connected through the normally closed contacts 90*c* and the normally open contacts 92C, respectively, through the normally closed contacts 93*b* and the normally open contacts 93B, respectively, through the normally closed contacts 91*a* to common line 65. Line 56 is connected through the normally open contacts 92A through the normally open contacts 93A and the normally open contacts 91A to common line 65. Lines 57 and 58 are connected through the normally closed contacts 90*a* and the normally open contacts 90A, respectively, through the normally closed contacts 92*a* and the normally open contacts 93A and 91A to common line 65. Line 59 is connected through the normally closed contacts 92*c* through the normally open contacts 93B through the normally closed contacts 91*a* to line 65**.

The operation of the units relay circuit 113 is best understood with reference to Table II. Assume that the signals on lines 28 through 31 is a Datex coded signal which represents an arabic decimal number zero. Thus relay 90 is energized and relays 91 through 93 are de-energized. In this condition the units relay circuit 113 connects line 50 to line 65 by means of the circuit established by closed contacts 90C, **93*b*, and 91*a*. Assume now that the signals on lines 28 through 31 is a Datex coded signal which represents an arabic decimal number one. The relays 90 and 91 are energized and relays 92 and 93 are de-energized. In this condition the units relay circuit 113 disconnects line 50 from line 65 and line 51 is connected by means of contacts to line 65. Thus it is seen that for each Datex coded signal applied to the lines 28 through 31 only one of the lines 50 through 59 is connected to common line 65 through contacts, that line being the one having a number with a magnitude equal to that of the arabic decimal number represented by the signal on lines 28 through 31. It will also be noted that a negative potential will be connected to the common output line 65 only when the equivalent arabic decimal reference signal, from the units command circuit 99, is equal to the equivalent arabic decimal signal from translator 26. In contrast to the units relay circuit 74 of matrix 46 the units relay circuit 113 of the "equal to" relay network 48 only connects the command signal to common line 65 when the signal applied to lines 28 through 31 equals the decimal command signal supplied by rotary switch 99**.

The tens relay circuit 114, the hundreds relay circuit 115 and the thousands relay circuit 116 are identical to the units relay circuit 113, therefore are indicated by dashed lines, and no further discussion will be directed to them. It should be understood that although relays 90 through 93 have been described as separate relays from relays 80 through 83, respectively, they could be the same respective relays with contacts added to provide the "equal to" relay network 48. Thus, for example, the units relay circuit 113 could have its contacts on relays 80 through 83 of FIG. 2.

Figure 4:
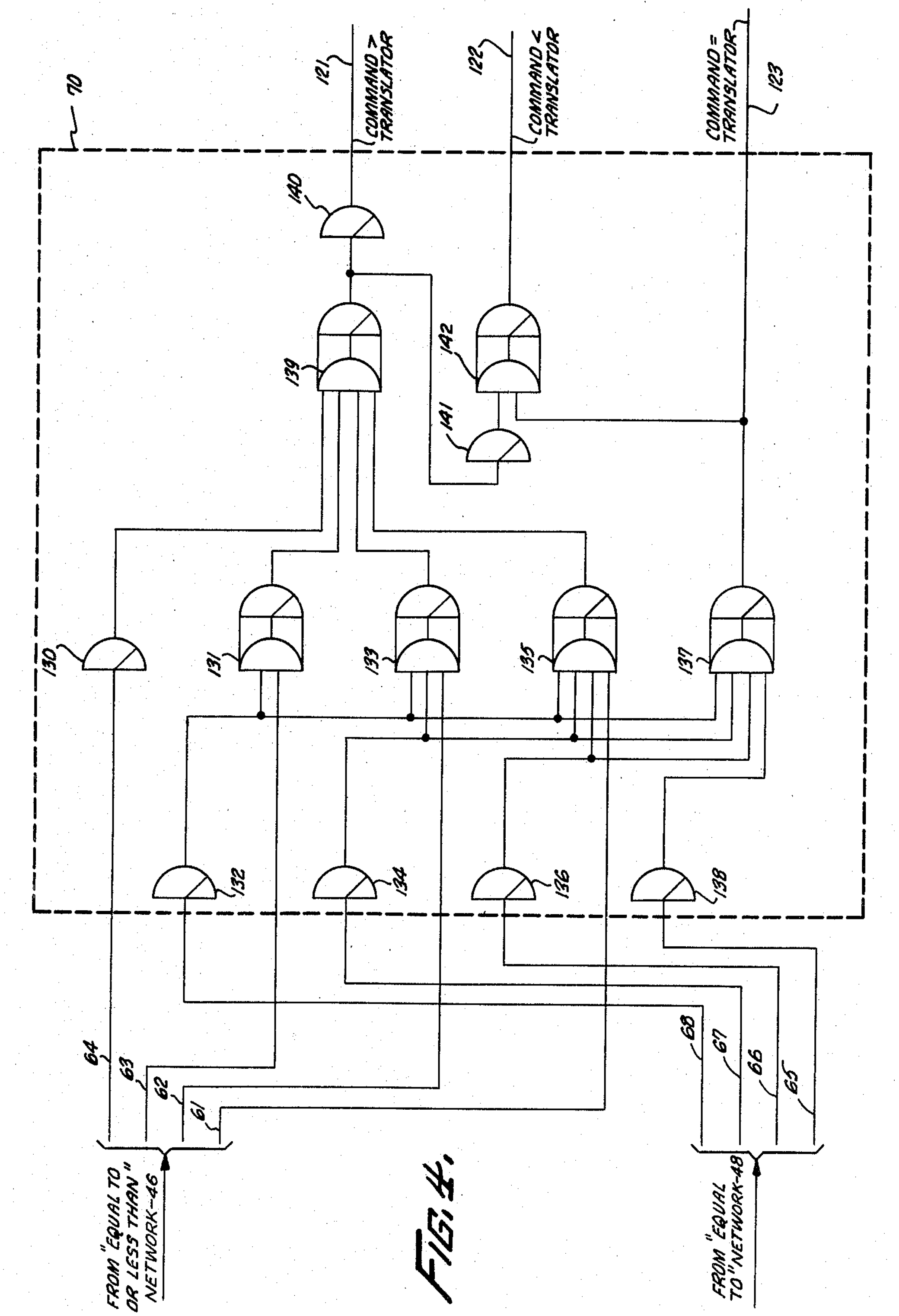
FIG. 4 is a block circuit diagram of a control circuit for use in the control and amplifier circuit of FIG. 1.

Refrering now to FIG. 4 a logical network is shown having inputs connected to common lines 61 through 68 and three output lines 121, 122, and 123. To be explained, a signal is applied to one of output lines 121, 122 and 123 and corresponding to the desired energization for motor 10 and may be used to energize an amplifier or other means for supplying energization to motor 10.

Before describing the logical circuit of FIG. 4, a brief explanation of terminology to be used will be given. The input signals on lines 61 through 68 are either open circuited or connected to a negative potential as discussed above. An inverter circuit has an input circuit connected to ground through a resistor, therefore, input lines connected to the input of an inverter circuit will be at ground potential when open circuited. In the following discussion a potential of zero volts will be referred to as a high potential signal and a negative potential will be referred to as a low potential. The output of an inverter is the complement of the input signal. Thus if there is a high potential input signal, the output signal will be low, and if the input signal is low, the output signal will be high. "Nor" circuits are circuits having two or more input circuits and are responsive to signals at its input circuits to produce a low output potential whenever all input signals are high, and are responsive to one or more low potential input signals to produce a high potential output signal.

Referring again to the circuit of FIG. 4, common line 64 is connected to an input circuit of inverter circuit 130. "Nor" circuit 131 has two input circuits, one input circuit being connected to line 68 through inverter circuit 132 and the other input circuit being connected directly to line 63. "Nor" circuit 133 has three input circuits, one input circuit being connected to the output of inverter circuit 132, another being connected to line 67 through inverter circuit 134 and the other input circuit being connected directly to line 62. "Nor" circuit 135 has four input circuits, two input circuits being connected to the output circuits of the inverter circuits 132 and 134, the other two input circuits being connected to line 66 through inverter circuit 136 and directly to line 61. "Nor" circuit 137 also has four input circuits, three of the input circuits being connected to the output circuits of inverter circuits 132, 134 and 136 and the other input circuit being connected to line 65 through inverter circuit 138. The output circuits of inverter circuit 130 and "nor" circuits 131 through 135 are connected to four input circuits of "nor" circuit 139 having an output circuit connected to input circuits of inverter circuits 140 and 141. The output circuits of inverter circuits 140 and 141 are connected to line 121 and an input circuit of "nor" circuit 142, respectively. Another input of "nor" circuit 142 is connected to an output circuit of "nor" circuit 137, the output circuits of "nor" circuits 142 and 137 being connected to output lines 122 and 123, respectively. To be explained in detail, the output circuits of inverter circuit 130 and "nor" circuits 131, 133 and 135 produce low potential output signals whenever the magnitude of the output signal of the source of command signals 17 is greater than the magnitude of the output signal of the translator circuit 26 for the thousands, hundreds, tens and units decades, respectively. Also the output signal on line 123 will be low whenever all decades of the output signals from the translator 26 and source of command signals 17 are equal, and the output signals on lines 121 and 122 will be low whenever the magnitude of all of the output signals from translator 26 are greater than and less than, respectively, the magnitdue of the output signals from the source of command signals 17.

The operation of the logical circuit is best understood by assuming initially that the command signal is greater than the output signal from the translator circuit 26, and by way of example, assume that the command signal is the arabic decimal number 9,111 and the output Datex signal from translator 26 represents an arabic decimal number 1,000. Since the thousands digit of the command signal is greater than the thousands digit from translator 26, the signal on line 64 is a high potential, and the inverter circuit 130 applies a low potential input signal to "nor" circuit 139. Since at least one of the input signals to "nor" circuit 139 is at a low potential, the output signal is at a high potential, causing a high potential to be applied to the input of inverter circuit 140. The output signal from inverter circuit 140, applied to line 121, is at a low potential indicating that the command signal is greater than the signal from translator 26. The high potential output signal from "nor" circuit 139 is also applied to the input of inverter circuit 141 which applies a low potential input signal to "nor" circuit 142. Since at least one input signal to "nor" circuit 142 is low, the output signal is a high potential, causing the output signal on line 122 to be high, indicating that the command signal is not less than the output signal from the translator circuit 26. The low potential output signal from inverter circuit 132 is also applied to an input of "nor" circuit 137 causing a high potential output signal to be applied to line 123 which indicates that the command signal is not equal to the output signal from translator 26.

Assume now that shafts 12 and 16 have rotated such that the Datex output signal from translator 26 now represents the arabic decimal number 9,000, and the output signal of the source of command signals 17 is stil 9,111. Since the thousands digits of the output signal from translator 26 and the source of command signals 17 are equal, the signals on lines 64 and 68 will be a low potential causing the output signal from inverter circuits 130 and 132 to be a high potential causing a high potential input signal to be applied to the input of "nor" circuit 131. Since the hundreds digit of the command signal is greater than the hundreds digit of the signal from translator 26, the potential applied to line 63 is also a high potential, therefore, the output potential of "nor" circuit 131 is a low potential. Since at least one input of "nor" circuit of 139 is a low potential, the output signal is again a high potential and the output signals on lines 121, 122 and 123 remain the same.

Assume now that shaft 12 has rotated such that the output signal from translator 26 is 9,100. The thousands digits and hundreds digits are equal and the potential on lines 64 and 68 remain low but now, the potential on lines 63 and 67 are low. Since the tens and hundreds digits of the command signal are larger than those of the translator output signal, the other of lines 61 through 68 have a high potential on them. Thus the output signal from inverter circuit 130 remains high, and since the potential applied to line 63 is low, one input to "nor" circuit 131 is low causing a high output potential to the input of "nor" circuit 139. The low potential signals applied to lines 67 and 68 and the high potential signal on the line 62 cause all signals to the input of "nor" circuit 133 to be high, and the output to be low, indicating that the tens digit of the command signal is larger than the tens digit of the signal from translator 26. Thus the output signal from "nor" circuit 139 remains high, and the output signals on lines 121, 122 and 123 remain unchanged.

Assume now that the shaft 12 is rotated such that the output signal from translator 26 is 9,110. Since the thousands, hundreds and tens digits are equal, the output signals on lines 63 and 64, 67 and 68 remain unchanged and the signals on lines 62 and 66 are a low potential. Therefore, the output signals of inverter circuit 130 and "nor" circuit 131 remain unchanged, and inverter circuit 136 applies a high potential input signal to "nor" circuit 135, since the units digit of the command signal is larger than that of the output signal from translator 26 and the signal on line 61 is a high potential, the output of "nor" circuit 135 is a low potential indicating that the command signal is larger than the signal from translator 26 in the units digit. Since the output signal from "nor" circuit 135 is a low potential, at least one input to "nor" circuit 139 is low causing output signal and the output signals on lines 121, 122 and 123 remain unchanged.

Now assume that shafts 12 and 16 have rotated such that the translator 26 output signal is equivalent to the arabic digit 9, 111, or equal to that of the command signal. The input signals on lines 61 through 68 are all low and the output signals from inverter circuit 130 and "nor" circuits 131, 133 remain unchanged, however, the output signal from "nor" circuit 135 now goes high since all input signals are now low. Since all input signals to "nor" circuit 139 are high, the output signal from "nor" circuit 139 is low causing the output circuit of inverter circuit 140 to apply a high potential to line 121 indicating that the command signal is no longer larger than the output signal from translator 26. Since inverter circuit 138 inverts the low potential signal on line 65 and applies a high potential to the input of "nor" circuit 137, all input signals to "nor" circuit 137 are now high causing a low output signal on line 123 indicating that the command signal is now equal to the output signal from translator 26. Since the signal on line 123 is low, the output signal from "nor" circuit 142 remains high, indicating the command signal is not smaller than the output signal from the translator 26.

Assume now that shafts 12 and 16 have rotated such that the output of translator 26 is equivalent to an arabic decimal number 9,112, and the command signal is still 9,111. Since the units digit of the command signal is smaller than the units digit of the output signal from translator 26, the signal on line 61 is low and the signal on line 65 is high causing the output signal from inverter circuit 138 to be a low potential and the output signal from "nor" circuit 137 on line 123 to be a high potential. Since all inputs to "nor" circuit 139 are high, the output signal is low causing a high potential signal on line 121. Since the input signal to inverter circuit 141 is low, the output is high. Since both inputs to "nor" circuit 142 are high, the output signal on line 122 is low indicating that the command signal is smaller than the output signal from translator 26.

Thus it is seen that the logical circuit can be examined by first looking at the output of inverter circuit 130. If the output is low, the command signal is larger than the output signal from translator 26 in the thousands level. If the output signal from inverter circuit 130 is high, you drop down and examine the output signal from "nor" circuit 131, and if the output signal of "nor" circuit 131 is low, the command signal in the hundreds level is larger than the hundreds level in the output signal from translator 26. If the output signal from inverter circuit 130 and "nor" circuit 131 are high, you drop down to the output of the "nor" circuit 133. If the output signal of "nor" circuit 133 is low, the command signal in the tens level is larger than the tens level in the output signal from the translator 26. If the output signal from the inverter circuit 130 and "nor" circuits 131 and 133 are high, you drop down to the output of the "nor" circuit 135. If the output signal of "nor" circuit 135 is low, the command signal in the units level is larger than the units level in the output signal from the translator 26. If the output signal of the inverter circuit 130 and "nor" circuits 131, 133 and 135 are high, you drop down to the output of "nor" circuit 137. When the output of "nor" circuit 137 is low, the command signal and output of translator 26 are equal.

It may also be appreciated by those skilled in the art that output signals on lines 121, 122 and 123 may be used to energize an amplifier or other means of controlling motor 10 and that motor 10 may be energized to rotate shaft 16 in either direction or not at all depending on the signals on lines 121, 122 and 123.

What is claimed is:

1. A comparison circuit comprising a source of reference signals, a source of variable digital signals to be compared with the reference signals, a comparison circuit coupled intermediate said sources and responsive to the reference signals and the digital signals substantially simultaneously, said comparison circuit including an equality comparison circuit for providing a unique signal indicative of when the digital signals are equal to the reference signals and a comparison circuit for providing output signals indicative of when the reference signals are equal to or less than the digital signals.

2. A comparison circuit as defined in claim 1 wherein said source of reference signals comprise switch contacts defining a preselected number and said comparison circuits comprise relay networks each connected to be responsive to the source of digital signals and each defining a unique circuit path in response to each different digital signal whereby a complete circuit path is provided through said equality comparison circuit and the contacts of said source of reference signals when the digital signal is representative of said preselected number and at least one complete circuit path is provided through said equal to or less than comparison circuit and said source of reference signals when the digital signal is representative of said preselected number or less than said number.

3. In a comparison system comprising a relay comparison network including an equality contact network and an equal to or less than contact network each having a plurality of first output circuits and a separate output circuit, a source of reference signals connected to provide a unique signal at one of the first output circuits of each contact network representative of the reference signal, a source of coded digital signals to be compared with the reference signal, said relay network including at least one control circuit connected to be responsive to the digital signal to provide a unique output signal at the separate output circuit of said equality contact network when the reference signal representation is equal to the representation of the digital signal and connected to be responsive to the digital signal to provide a unique output signal at the separate output circuit of said equal to or less than contact network when the reference signal representation is equal to or less than the representation of the digital signal.

4. A comparison unit comprising an equality contact network and an equal to or less than contact network each having a plurality of output circuits having assigned number weights and a separate output circuit, a source of reference signals connected to provide a unique signal at a weighted output circuit of each contact network having an assigned number weight corresponding to the reference signal, a source of coded digital signals representative of the number weights of said weighted output circuits for comparison with the reference signal, said relay network including at least one control circuit connected to be responsive to the digital signal for actuating said contact networks for providing a path between the unique reference signal and the separate output circuit of said equality contact network when applied to a weighted circuit having an assigned number representation equal to that of the digital signal and for actuating said contact networks for coupling the unique reference signal to the separate output circuit of said equal to or less than contact network when applied to a weighted circuit having an assigned number representation equal to or less than that of the digital signal.

References Cited in the file of this patent

UNITED STATES PATENTS

| | | |
|---|---|---|
| 2,660,372 | Le Clerc | Nov. 24, 1953 |
| 2,714,201 | Whitehead | July 26, 1955 |
| 2,749,440 | Cartwright | June 5, 1956 |
| 2,775,727 | Kernahan et al. | Dec. 25, 1956 |
| 2,785,856 | Hobbs | Mar. 19, 1957 |
| 2,844,309 | Ayres | July 22, 1958 |
| 2,844,811 | Burkhart | July 22, 1958 |
| 2,872,114 | Wilson | Feb. 3, 1959 |
| 2,884,616 | Fillebrown et al. | Apr. 28, 1959 |
| 2,885,613 | Myracle et al. | May 5, 1959 |
| 2,899,673 | Reiner | Aug. 11, 1959 |
| 2,909,769 | Spaulding | Oct. 20, 1959 |
| 2,953,773 | Nicolantonio | Sept. 20, 1960 |

UNITED STATES PATENT OFFICE
CERTIFICATE OF CORRECTION

Patent No. 3,127,587 March 31, 1964

Svein Rasmussen et al.

It is hereby certified that error appears in the above numbered patent requiring correction and that the said Letters Patent should read as corrected below.

Column 1, line 16, for "shift" read -- shaft --; column 3, Table I, sixth column, line 5 thereof, for "OOXX" read -- OOXO --; same Table I, sixth column, line 6 thereof, for "OXXX" read -- OOXX --; same Table I, sixth column, line 7 thereof, for "OXOX" read -- OXXX --; same Table I, first and second columns, between lines 7 and 8 thereof, insert -- 7 --; same Table I, sixth column, between lines 7 and 8 thereof, insert -- OXOX --; column 4, line 65, for "straps" read -- steps --; column 7, line 60, for "Refrering" read -- Referring --; column 8, line 52, for "magnitdue" read -- magnitude --.

Signed and sealed this 28th day of July 1964.

(SEAL)
Attest:

ESTON G. JOHNSON
Attesting Officer

EDWARD J. BRENNER
Commissioner of Patents